United States Patent
Dochterman

[11] 3,891,878
[45] June 24, 1975

[54] DYNAMOELECTRIC MACHINE HAVING IMPROVED LUBRICATION SYSTEM

[75] Inventor: Richard W. Dochterman, Fort Wayne, Ind.

[73] Assignee: General Electric Company, Fort Wayne, Ind.

[22] Filed: Feb. 14, 1973

[21] Appl. No.: 332,265

[52] U.S. Cl. ............... 310/90; 308/125; 308/132; 308/171
[51] Int. Cl. ...... F16c 1/24; F16c 33/66; F16c 13/02
[58] Field of Search .......... 308/125, 132, 163, 171, 308/36.4; 310/90

[56] References Cited
UNITED STATES PATENTS

| | | | |
|---|---|---|---|
| 2,402,565 | 6/1946 | Madsen | 308/125 |
| 2,600,353 | 6/1952 | Wightman | 308/163 |
| 2,752,208 | 6/1956 | Wightman | 308/171 |
| 2,945,729 | 7/1960 | Mitchell | 308/132 |
| 2,960,371 | 11/1960 | Staak | 308/132 |
| 3,048,454 | 8/1962 | Irvin | 308/36.4 |
| 3,184,272 | 5/1965 | Ridgway | 208/132 |
| 3,434,765 | 3/1969 | Abel | 308/132 |
| 3,625,577 | 12/1971 | Coleman | 308/36.4 |
| 3,703,221 | 11/1972 | Merkle et al. | 184/6.27 |

Primary Examiner—J. D. Miller
Assistant Examiner—Robert J. Hickey
Attorney, Agent, or Firm—Ralph E. Krisher, Jr.

[57] ABSTRACT

Lubrication system includes lubricant reservoir that contains an extrudable base material impregnated with lubricant, such as oil. Motor parts, including the reservoir defining parts, are readily assembled with one another and retaining means is provided that permits the efficient transfer of oil to extrudable base material, but prevents inadvertent movement of base material away from a predetermined locale in reservoir. In one illustrated form, such means are in the form of a plastic member or basket having perforations therein of a size to restrict the movement of extrudable base material therepast and yet promote the movement of oil into the predetermined locale. In another form a retainer member is fabricated from a lanced and expanded metallic material that forms a perforated base material retainer or basket. Retainer may be collapsed to permit accommodation thereof in reservoirs of various lengths, and reduce need to stock differently sized retainers for machines having different reservoir dimensions. Method includes extruding material quickly through a plurality of extrusion openings, so as to reduce tendency to form air pockets or voids within reservoir and reduce filling time; and restricting free flow or movement of the extruded material with a perforated or foraminous wall.

13 Claims, 5 Drawing Figures

PATENTED JUN 24 1975 SHEET 2 3,891,878

DYNAMOELECTRIC MACHINE HAVING IMPROVED LUBRICATION SYSTEM

BACKGROUND OF THE INVENTION

This invention relates generally to dynamoelectric machines and, more particularly, to such machines having new and improved bearing lubrication systems.

In rotating dynamoelectric machines, e.g., motors, generators, and alternators; a rotatable member is supported by one or more bearing devices for rotation relative to a stationary member. Such bearing devices or systems may be, for example, of the rolling bearing type (e.g., ball bearings) or of the journal bearing type (e.g., sleeve bearings). Although the principles of the invention described herein may be used to advantage with either of these types of systems, the detailed description will proceed with particular reference to dynamoelectric machines of the sleeve bearing type and the invention will be discussed in connection with embodiments illustrated as fractional horsepower sleeve bearing machines.

It will be understood that, for satisfactory operation over long periods of time (e.g., for a number of years), means must be provided that will maintain an adequate supply and flow of lubricant to a sleeve bearing.

Common approaches heretofore have included the provision of lubricant storage and feeding means that store a supply of lubricating material, such as oil, and that provide a supply of oil for a bearing during motor operation. After the oil has moved along bearing surfaces during operation, the oil is then recirculated to the lubricant reservoir. For many years, lubricant reservoir cavities have been designed to accommodate materials such as felt. This felt absorbs and thus stores oil that could later be wicked or fed to a bearing during motor operation. More recently, materials have been developed which may be injected or otherwise very quickly disposed in a lubricant reservoir cavity adjacent to a motor bearing, and such materials then also are relied upon (with or without felt feed wicks) to feed oil to the motor bearing during operation. One of the materials that has been used heretofore is described for example in M. L. Abel Pat. No. 3,434,765 and the same type of material is referred to in Ridgway Pat. No. 3,184,272.

The particular material mentioned in the Abel and Ridgway patents is marketed under the name PERMAWICK by the Permawick Company of Detroit, Mich. Other approaches utilize the type of lubricating material or materials of the type described either in Staak Pat. No. 2,979,779 or James Whitt's applications Ser. Nos. 292,664 and 292,550, (both now abandoned) both of which were titled "Extrudable Lubricant" and are assigned to the assignee of this application. The use of any of these types of materials may contribute to reduced labor costs associated with manufacturing motors, but problems have been encountered due to the difference in the physical nature and characteristics between felt materials and extrudable lubricant materials.

For example, there is a tendency for extrudable materials to flow into portions of lubricant defining reservoirs other than those selected to be filled with such material; whereas pieces of felt tend to stay where they have been placed. In addition, much care must be taken to ensure that extrudable materials do not obstruct or interfere with oil recirculating means such as oil slingers. Even when this has been done, however, the time required to fill a reservoir with extrudable lubricant has been relatively long because only one, or at most two, extrusion ports have been used during filling of such reservoirs. Accordingly, it would be desirable to provide dynamoelectric machines having a new and improved lubrication system, and methods to be used when making or manufacturing the same that would overcome problems mentioned above as well as other problems that will become more apparent from the following disclosure.

SUMMARY OF THE INVENTION

Accordingly, it is a general object of the present invention to provide a new and improved lubrication system in a dynamoelectric machine whereby extrudable lubricant storage materials may be quickly and controllably placed and reliably used in practice.

A more specific object of the present invention is to provide a new and improved lubrication system wherein means are provided that may be assembled readily with other motor parts; such means retaining an extrudable base material in a predetermined locale and yet encouraging the circulation of oil to the extrudable base material.

Another object is to provide new and improved methods for use in the manufacture of dynamoelectric machines that utilize extrudable lubricants.

In carrying out the above and other objects in a preferred form thereof, I provide a lubrication system in a fractional horsepower motor of the sleeve bearing type wherein an end shield, in conjunction with other parts, establishes a lubricant reservoir that contains an extrudable base material that provides a storage means for a lubricant, such as oil. The parts of the motor, including the reservoir defining parts, may be readily assembled with one another and retaining means is provided that permits the efficient transfer of oil to the extrudable base material, but prevents inadvertent movement of such base material away from a predetermined locale. In one illustrated form, such means are in the form of a plastic mesh member or basket having perforations therein of a size to restrict the movement of extrudable base material therepast and yet promote the movement of oil into the predetermined locale. In another illustrated form, such means is in the form of a mesh retainer member fabricated from a lanced and expanded metallic material that forms a perforated base material retainer or basket. In both forms, the basket may be collapsible to permit accommodation thereof in reservoirs of various lengths, so as to eliminate the need to stock differently sized retainers for machines having different reservoir dimensions. In the practice of my method in one preferred form, I extrude material quickly through a plurality of extrusion openings, so as to reduce the tendency to form air pockets or voids within the reservoir and to reduce filling time; and restrict the free flow or movement of the extruded material with a perforated or foraminous wall.

The subject matter which I regard as my invention is particularly pointed out and distinctly claimed in the concluding portion of the specification. The invention itself however, both as to its organization, mode of operation, and preferred practice; together with further advantages thereof, may best be understood by reference to the following description taken in conjunction with the accompanying drawings.

DESCRIPTION OF THE PREFERRED EMBODIMENTS

Figure 1:
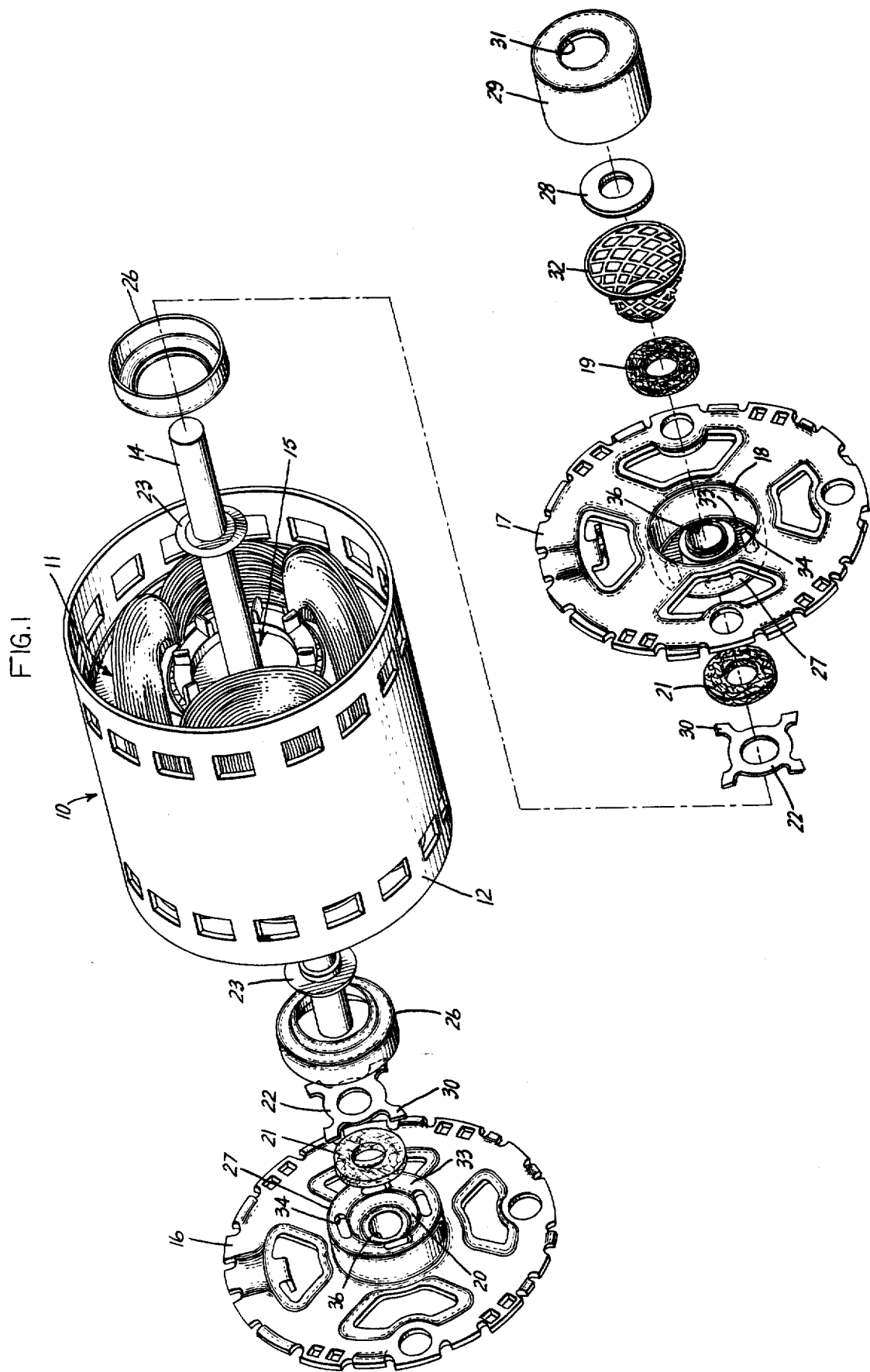
FIG. 1 is an exploded perspective view of a fractional horsepower induction motor embodying the invention in one form.

Turning now to the drawings in more detail, I have shown a fractional horsepower motor 10 that includes a conventional wound stator core assembly 11, a case or housing 12, and a rotor assembly 15 which includes a short-circuited squirrel cage winding supported on a laminated magnetic core, and a shaft 14. The motor also includes a pair of end frames, end shields, or end bells (these terms being used interchangeably in the art) denoted by the reference numerals 16, 17. The end frames 16, 17 may be die cast, stamped, or formed in any other convenient manner and they may be substantially identical to one another as shown; although it will be appreciated that if the shaft 14 is to extend through only one of the end frames, the other of the end frames may be provided with a solid cap or solid wall in line with the end of the shaft.

A cavity 18 in the end frame 17 is readily apparent from FIG. 1 and, it is in this cavity that felt shaft wicks 19, retainer 32, and oil throwers or slingers 28 will be positioned after assembly of the motor. Each end frame also at least partly defines a cavity 20 that accommodates a felt wick 21, thrust member 22, and shaft mounted thrust collar 23.

The other parts shown in FIG. 1 include interior end caps 26 that are pressed onto a hub 27 of each end shield so as to assist in defining cavity 20 and so as to trap the thrust members 22 against the hub 27; and end caps 29. The oil throwers 28 may be of any desired construction and material, although a laminated plastic and synthetic rubber construction has been illustrated.

If the shaft 14 is not intended to extend through the end shield 16, the not shown end cap used in conjunction with end shield 16 will not be provided with a shaft accommodating hole such as the hole 31 in the illustrated end cap 29.

The reservoir cup or basket 32 could be molded from any suitable plastic material including nylon, polyvinyl chloride, etc., as will be explained hereinafter. However, the basket 32 of FIGS. 1 and 2 is formed from a sheet of about .025 of an inch thick aluminum as will be explained hereinafter in conjunction with FIG. 5.

Figure 2:
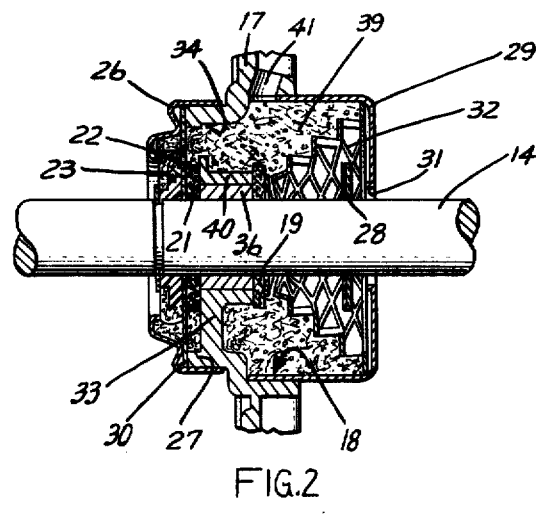
FIG. 2 is a side elevation, with parts in section, parts removed, and parts broken away, showing the relationship of parts of the motor of FIG. 1 after it has been assembled and lubricated.

Lubricant retaining material has not been shown in FIG. 1 for ease of illustration, but an extrudable lubricating material containing cellulose fibers of the type described in the above-referenced Abel patent has been shown in FIG. 2, along with the parts associated with the lubrication system for the bearing 36. A bearing 36, of course is supported by each of the end frames; although it should be expressly understood that the present invention may also be utilized in single or "unit" bearing type motors.

With reference now to FIG. 2, one convenient method of assembly includes positioning the oil wick 19 against the end face of the bearing 36 (the hub 40 of end frame 17 holding such bearing), positioning basket 32 in concentric relationship within the cavity 18 of end frame 17, and then pressing the end cap 29 into place relative to the end frame. It will be noted that the parts preferably are dimensioned so that a relubricating passage 41 is left unobstructed.

Either before or after the just described procedures, the oil wick 21 is positioned against an end face of bearing 36, thrust member 22 is positioned so that the arms 30 thereof do not overlie the openings 34 in the end frame 17, and cover 26 is pressed into place. Since the arms 30 are positioned against the solid material webs 33 of the end frame, openings 34 establish four spaced apart ports through which lubricating material may be extruded later.

With the cover 26 pressed onto the hub 27 of the end frame 17, an end frame subassembly is formed that is ready for injection of an extrudable lubricant material. Preferably, this is done with an extruding nozzle designed to supply extrudable lubricant through each of the openings 34 in the end frame 17 by forcing the extrudable lubricating material into the lubricant reservoir under pressure. The extruded lubricating material so placed has been denoted by the reference numeral 39 in FIG. 2.

Thereafter, the shaft 14 (with the rotor body and thrust member 23 previously assembled therewith as will be understood) is inserted through the opening of the oil well cover 26, the leading end of the shaft 14 (the right hand end thereof as viewed in FIG. 2) slides through the bearing 36, oil wick 19, oil thrower 28, and through the opening 31 in cover or cap 29. The hole in the thrower 28 is sized so that the thrower 28 will have a friction, but slip fit on shaft 14. After the rotor and end frame assemblies have been assembled together, the oil thrower 28 can be moved to a desired position on shaft 14 as shown in FIG. 2 by a small tool that is slipped through the opening 31 so as to slide the thrower 28 along the shaft 14 toward bearing 36. There is sufficient frictional engagement between shaft 14 and oil thrower 28 to prevent subsequent undesired and inadvertent axial movement of the thrower 28 along shaft 14 during motor operation.

The walls of cup 32 keep the extrudable base material within a predetermined locale of cavity 18 as shown in FIG. 2. The interior of cup or retainer 32 is substantially free of extrudable base material, and, for ease of description, this interior region will be referred to hereinafter as an "oil slinger cavity". The retainer 32 provides the additional advantage of holding oil wick 19 in a desired predetermined position at the end of the double end feed sleeve bearing 36; it being understood that in the FIG. 2 arrangement; oil will be fed to each end of bearing 36. However, it should be clearly understood that bearing 36 could be of the center feed variety and a window may be provided in the bearing mounting hub 40 so as to facilitate such feed. The retainer 32 also holds wick 19 from rotation with shaft 14 and thus assures that oil will be wicked to bearing 36.

The holes in the retainer 32 are about one-tenth of an inch maximum as measured in any direction and readily permit the return of oil from slinger 28 to the lubricant retaining mass 39. The size of the openings in the cup or basket 32 are, however, sufficiently small to prevent the extrudable base material of mass 39 from being extruded therethrough while cavity 18 is being filled with the desired predetermined amount of lubricating material.

It should be noted that while the showing of FIG. 2 is substantially accurate, the view actually represents a diagonal cut taken through the end frame 17 so as to show the relationship of an opening 34 therein as well as a solid portion 33 in the same view.

Figure 5:
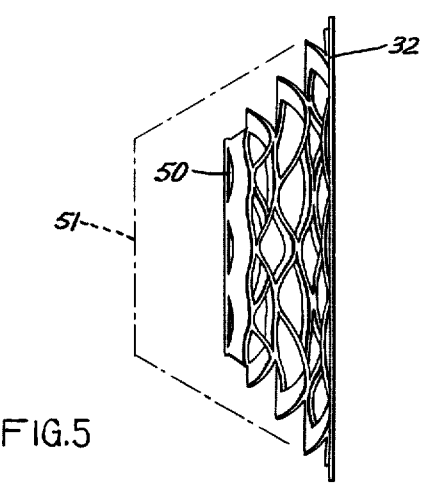
FIG. 5 is a side elevation of the retaining means shown in FIGS. 1 and 2.

The retainer 32 is shown to an enlarged scale in FIG. 5. Retainer 32 is made from sheet aluminum by lancing the sheet and punching a shaft admitting hole therein. Thereafter, the sheet is expanded in known fashion until the end 50 thereof coincides with the segment 51 of the phantom line shown in FIG. 5. Desirably, the overall expanded size of retainer 32 as measured in a direction along the axis of shaft 14 would be greater than the space in which the retainer 32 is to be finally positioned. In this manner, it can be assured that compressive forces will be applied to the retainer after assembly so as to ensure that the oil feed wick 19 will be pressed against the end face of the bearing 36.

Retainer 32 can be made of a sufficiently large size that it will be properly assembled with the largest physical size of motor and bearing system in which it is contemplated that retainer 32 will be used. Then, for motors having smaller dimensions, or lubricant reservoirs having smaller dimensions, the retainer 32 may be collapsed to the configuration shown in FIG. 5 and be useable without problem in such smaller motors. This technique eliminates the need to provide retainers of different sizes for differently sized motors. While specific reference has been made to aluminum as the material from which retainer 32 may be fabricated it will be appreciated that the cup could be formed of substantially any other ferrous or non-ferrous material that is suitable for use in lubricant retaining systems. A more detailed description of the specific techniques used to lance and expand the retainer 32 is not here presented, since those techniques are known in the metal fabricating art.

Figure 3:
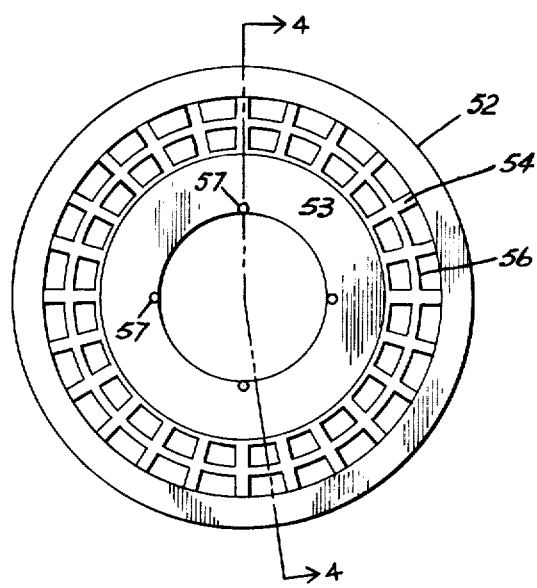
FIG. 3 is an end elevation of one form of retaining mans that may be used in lieu of the retaining means shown in FIGS. 1 and 2.
Figure 4:
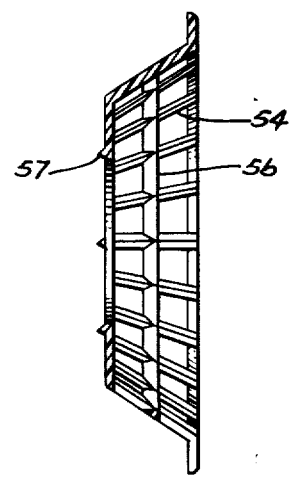
FIG. 4 is a view taken along the lines in the direction of arrows 4—4 in FIG. 3.

Turning now to FIGS. 3 and 4, I have there shown another basket or retainer 52 which has been molded from a plastic material. More specifically, the cup 52 was molded from polyvinyl chloride although other suitable synthetic materials may be used. Preferably, the retainer 52 will be of a sufficient size to ensure that an oil feed wick adjacent to the face 53 thereof will not rotate with a motor shaft. However, this obviously is not critical and, particulary is not critical in those applications where end feed bearings are not used or in those applications where end oil wicks corresponding to oil wicks 19 and 21 are not provided.

The retainer 52 shown in FIGS. 3 and 4 may also be axially compressed or shortened in the same manner as has been described in conjunction with FIG. 5, although the range of adjustment of plastic members generally would not be expected to be as great as that which may be accomplished with expanded metal structures; even though polyvinyl chloride may be extremely flexible and member 52 can, essentially, be turned inside out without breaking or tearing the interconnecting webs 54, and 56.

When the retainer 52 is formed by molding from a plastic material it may be convenient to provide projections or tabs 57 at spaced apart locations thereon. These then may be used to advantage to prevent rotation of an oil feed wick 19 because projections 57 will impinge on a relatively soft wool felt wick. Similar means may be provided in the form of pierced or lanced regions along the end face 50 of the retainer 32.

It should now be apparent to those skilled in the art that while I have shown and described what at present is considered to be preferred embodiments of my invention in accordance with the Patent Statutes, changes may be made in the arrangements and methods disclosed without actually departing from the true spirit and scope of the invention; and I therefore intend to cover in the following claims all such equivalent variations as fall within the invention.

What I claim as new and desire to secure by Letters Patent of the United States is:

1. In a dynamoelectric machine comprising a stator assembly and a rotor assembly having a shaft, said stator assembly including an end frame, a bearing supported in said end frame and a lubrication system of the type wherein lubricant flows from a lubricant reservoir to an oilwicking material in contact with the shaft for feeding lubricant to a bearing and then recirculates to the lubricant reservoir, the lubrication system comprising a lubricant reservoir, an extrudable lubricant retaining base material within at least a portion of the reservoir for storing lubricant therein and for supplying lubricant to the bearing, the improvement wherein: the lubrication system comprises means for retaining the base material within a predetermined locale in the reservoir and for promoting the recirculating movement of lubricant from the vicinity of the bearing to the base material in the predetermined locale; said means for retaining at least in part defining the predetermined locale and said means for retaining comprising a mesh basket member having a plurality of openings through which circulating lubricant may pass in one direction and through which the free passage of an extrudable lubricant retaining base material in a direction opposite to the one direction is inhibited, said basket member extending axially relative to the shaft and defining a cavity about at least a portion of the shaft.

2. The structure of claim 1 wherein said member comprises a basket shaped retainer.

3. The structure of claim 1 wherein said member comprises a molded plastic retainer having a plurality of openings therein.

4. The structure of claim 1 wherein said member comprises an expanded metal retainer.

5. The structure of claim 1 wherein said member defines an oil thrower cavity.

6. An end frame assembly for an electric motor comprising a bearing, oilwicking material for contacting a shaft and for feeding lubricant to the bearing, a plurality of wall defining members defining a chamber around the bearing and oil impregnated material substantially filling a predetermined portion of the chamber and pressed into intimate engagement with at least some of the walls defining such chamber and substantially surrounding the bearing; at least part of the chamber being established by a retainer having a plurality of openings formed therein with said retainer preventing the oil impregnated material from passing therethrough and away from the bearing during normal use, and readily permitting the passage therethrough of oil circulating from the bearing to the impregnated material, said retainer being positioned to define an axially extending cavity for accommodation of a portion of a shaft.

7. The assembly of claim 6 wherein said retainer is provided with openings having a maximum dimension of about one-tenth of an inch.

8. An end frame assembly for a dynamoelectric machine having a shaft supported by at least one bearing, oilwicking material for contacting the shaft and for feeding oil to the bearing and an oil slinger rotatable with the shaft, said end frame assembly comprising a plurality of wall defining members defining a chamber around a bearing and an oil impregnated material substantially filling a predetermined portion of the chamber and pressed into intimate engagement with at least some of the walls defining such chamber; at least part of the chamber being established by a retainer having a plurality of openings formed therein with said retainer preventing the oil impregnated material from passing therethrough to the oil slinger during normal use, and readily permitting the passage of oil therethrough from the oil slinger, the retainer defining a chamber for the oil slinger about a predetermined circumferentially and axially extending shaft accommodating region, and the retainer being axially compressible so that it is collapsible to different axial lengths and thereby useable in end frames of different sizes.

9. The assembly of claim 8 wherein said retainer is formed of expanded sheet material.

10. The assembly of claim 9 wherein said sheet material is aluminum.

11. The assembly of claim 6 wherein said retainer is formed of plastic material.

12. The assembly of claim 11 wherein said plastic material is polyvinyl chloride.

13. A dynamoelectric machine comprising a stator assembly; a rotor assembly including a shaft; at least one bearing system having a bearing supporting the rotor assembly for rotation relative to the stator assembly; flowable and extrudable lubricant retaining material disposed adjacent to the bearing of the at least one bearing system; a feed wick member contacting the shaft for feeding lubricant to the shaft form the lubricant retaining material and means for mechanically retaining the flowable and extrudable lubricant retaining material in predetermined spatial relation with the shaft, and for permitting movement of lubricant to the flowable and extrudable lubricant retaining material from the vicinity of the shaft; said means for mechanically retaining comprising a retainer spaced radially from and extending axially along the shaft, said retainer having a plurality of perforations therein that establish lubricant transmitting passages with the perforations being defined by webs of material that define a cavity about the shaft and which restrain the flowable and extrudable lubricant retaining material from moving into engagement with the shaft, while permitting the flow of lubricant therepast.

* * * * *